(12) United States Patent
Young

(10) Patent No.: US 8,365,290 B2
(45) Date of Patent: Jan. 29, 2013

(54) WEB APPLICATION VULNERABILITY SCANNER

(76) Inventor: Frederick Young, Atlanta, GA (US)

( * ) Notice: Subject to any disclaimer, the term of this patent is extended or adjusted under 35 U.S.C. 154(b) by 754 days.

(21) Appl. No.: 12/466,728

(22) Filed: May 15, 2009

(65) Prior Publication Data

US 2010/0293616 A1    Nov. 18, 2010

(51) Int. Cl.
  *G06F 21/00*    (2006.01)
(52) U.S. Cl. .......................... 726/25; 726/22
(58) Field of Classification Search ............ 726/25
  See application file for complete search history.

(56) References Cited

U.S. PATENT DOCUMENTS

| | | | |
|---|---|---|---|
| 2003/0159063 A1* | 8/2003 | Apfelbaum et al. | 713/200 |
| 2003/0233581 A1* | 12/2003 | Reshef et al. | 713/201 |
| 2007/0074169 A1* | 3/2007 | Chess et al. | 717/126 |
| 2009/0049547 A1* | 2/2009 | Fan | 726/22 |
| 2009/0119777 A1* | 5/2009 | Jeon | 726/25 |
| 2010/0050263 A1* | 2/2010 | Weisman | 726/25 |

OTHER PUBLICATIONS

Chen et al., "Large-Scale Analysis of Format String Vulnerabilities in Debian Linux", Jun. 14, 2007, ACM, pp. 75-84.*
Falk et al., "Analyzing Websites for User-Visible Security Design Flaws", Jul. 23-25, 2008, Symposium on Usable Privacy and Security, pp. 1-10.*
Foneseca et al., "Testing and comparing web vulnerability scanning tools for SQL injection and XSS attacks", 2007, IEEE Computer Society, pp. 365-372.*
Huang et al., "Securing Web Application Code by Static Analysis and Runtime Protection", May 17-22, 2004, ACM, pp. 40-51.*

* cited by examiner

*Primary Examiner* — Matthew Smithers
(74) *Attorney, Agent, or Firm* — Schmid PA

(57) ABSTRACT

Disclosed is a method for quickly indentifying vulnerabilities in web applications. The method determines website links of interest and evaluates sites for web application vulnerabilities. Both in the selection of links and in their evaluation the method employs various heuristics to enforce a fast evaluation while requiring minimal resources to run.

17 Claims, 2 Drawing Sheets

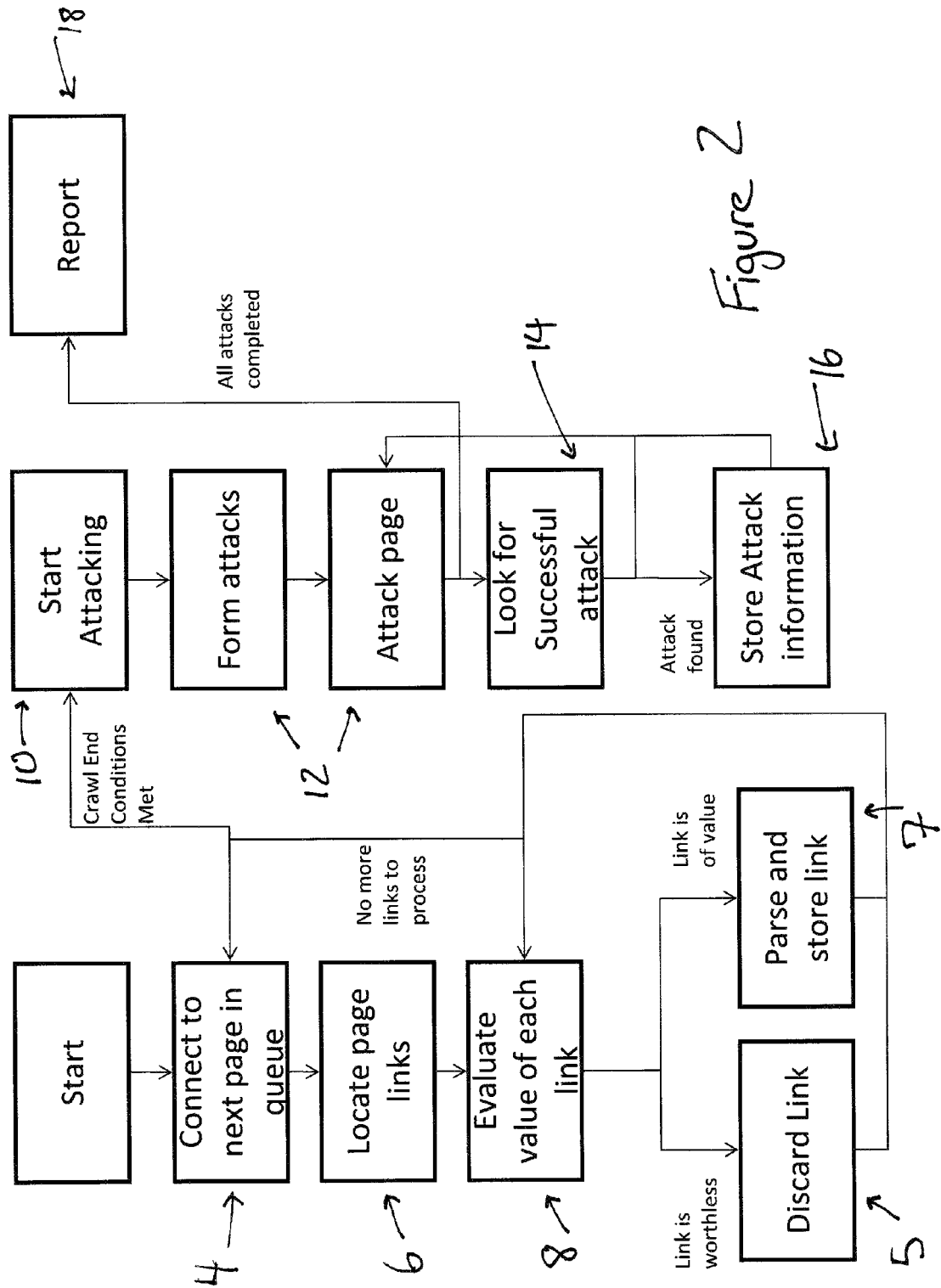

WEB APPLICATION VULNERABILITY SCANNER

TECHNICAL FIELD

Figure 1:
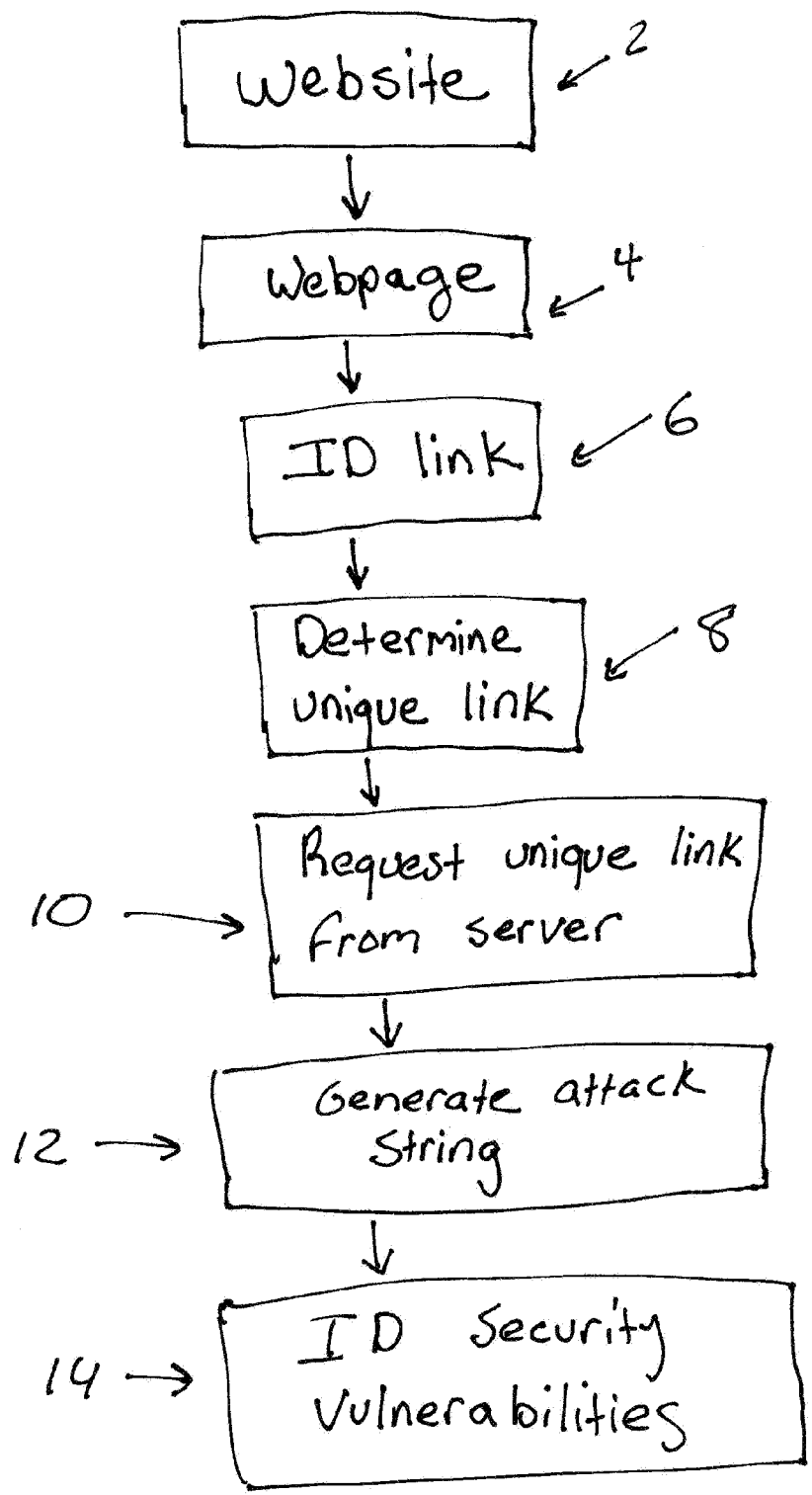

The present invention generally relates to computer security and in greater detail to a system and method for indentifying vulnerabilities in web applications in a quick and effective manner.

BACKGROUND

Web application security has risen to become a top priority for security professionals striving to control the overall risk profile of an organization. A majority of websites typically have vulnerabilities wherein most attacks specifically target the application layer to exploit weaknesses. Such attacks are often designed to steal critical financial and customer data. Security attacks can lead to a loss in finances, productivity and reputation of an organization.

One method often used for securing a network simply involves launching a long list of signature-based attacks. Signature based vulnerability scanning only functions within a known script without regard for the structure of the underlying application which resulting in poor coverage and inaccurate results.

Signature based vulnerability scanning major flaw is its inability to test unknowns. When signature based scanners encounter something new or unexpected, the scanner fails to adequately test it. Unknown or expected vulnerabilities thrive in the web application space. Many companies develop and maintain web applications written by them for their company. This means that signature based scanning cannot consistently catch web application vulnerabilities in custom web applications.

In answer to the short coming of signature based vulnerability scanning, the web application scanner was developed. Web application scanners are computer programs which communicate with web applications through the web front-end in order to identify potential security vulnerabilities in the web application. Web application scanners are automated tools checking a website's applications for common security problems such as cross site scripting and remote command execution vulnerabilities. These web application security scanners crawl through a website and parse the "url" to identify vulnerabilities in the website by injecting various attack vectors while maintaining the session state.

While current web application scanners are an improvement over signature based scanners, such web application scanners have significant shortcomings. One significant shortcoming is the time it takes the scanner to complete its assessment. Web application scanners typically take between a few hours to a few days to complete their assessment. Additionally, scanners primarily run only in a Windows environment and lack the ability to run multiple scans simultaneously. Furthermore, the scanner may be destructive to the web application being scanned and are typically expensive.

Thus, what is needed is a web application scanner which both effective and relatively quick in completing its assessment.

SUMMARY

The present invention comprises a method for indentifying vulnerabilities in web applications in a quick and effective manner. The method basically determines website links of interest and evaluates the links for web application vulnerabilities. Both in the selection of links and in their evaluation the method employs various heuristics to enforce a fast evaluation while requiring minimal resources to run. Furthermore, in an embodiment the method is designed to be independent of the operating system.

In greater detail, the method of detecting website vulnerabilities includes connecting to a website to evaluate the website for web application vulnerabilities. The method includes retrieving a webpage from the website and identifying a link within the retrieved webpage. The method further includes comparing the identified link to a known database of links to determine a unique link. Once the unique links are identified the method requests the unique links from a server evaluating for vulnerabilities. The method then generates an attack string directed to the requested unique link and identifies any security vulnerabilities within the requested unique link.

The method in a further embodiment includes various end conditions for accelerating the evaluation process. Once met the "end conditions" may signal the method to end the retrieval of webpages and identification of links. Example end conditions may include a time based event, a determined number of examined links event and a lack of new webpages to crawl. The time based event may be between about 5 to 15 minutes and the determined number of examined links event may be between about 300 to 700 links.

Additionally, the generated attack string instructs to evoke a plurality errors. The plurality of errors may be selected from two or more of the vector groups essentially consisting of structured query languages (SQL), cross-site scripting (XSS), remote file inclusion (RFI) and combinations thereof.

Furthermore, the known database may be comprised of links previously found and identified by the method. In determining the unique link in an embodiment includes evaluating a degree of uniqueness when compared to the known database. A unique link may be further determined by comparing the degree of uniqueness to a uniqueness threshold in determining the unique link.

DRAWINGS

In the drawings:

FIG. 1 depicts an embodiment of the present method as a flow chart showing the identification of links of interest and identifying security vulnerabilities; and FIG. 2 is a further flow chart of an embodiment of the method showing in greater detail the parsing and storing of the links and generating stored attack information and report.

DETAILED DESCRIPTION

Disclosed is a method for quickly indentifying vulnerabilities in web applications. The method determines links of interest and evaluates sites for web application vulnerabilities. Both in the selection of links and in their evaluation the method employs various heuristics to enforce a fast evaluation while requiring minimal resources to run.

The method in one embodiment may be comprised of a language platform independent of an operating system. An example language would be a dynamic object-oriented programming language such as Python, from the Python Software Foundation.

Heuristics are incorporated into the web crawling portion which gathers as much of the website as possible without actually visiting every page. The heuristic may be based off of the concept of diminishing returns, so the algorithm will throw away potential attack vectors or not investigate them further if the algorithm determines the vectors are of little use to the overall testing. Vulnerabilities can be tested by combining the results of the web crawl with an attack engine that is designed to generate the most amount of testing with the fewest tests run.

Link Determination

In greater detail, unique links for further investigation are determined based upon a comparison test to a known database comprised of known links or those already having been categorized. Thus, in an embodiment when a link is identified from a page fetched by the crawling engine the link may be classified with an identifying marker. For example, the identifying marker may be a unique stamp, similar to a hash, but not exactly. Marking aids in identifying how unique a link is when it is encountered. The link determination phase attempts to cover as much of a website as possible using the least number of page requests to the web server in as little time as possible.

The process of link determination may further be expressed as being comprised of two "buckets" from which the links are pulled. The first bucket is a list of links left to be crawled or unique links to be requested from the server and tested. The second bucket comprises the known database of links having been previously categorized.

In the identification of links, the method looks for various factors in determining the uniqueness of the link and if the link will be tested for vulnerabilities. For example, if the method determines the identified link is a duplicate from the known database, the identified link is discarded. The link may also be discarded if it is only slightly different from those in the known database and only a few new links were found the last time the slightly different link occurred.

The identified link may be both set aside for testing and categorization in the known database if the link is completely new and not in the known database. Additionally the link may be tested and categorized in the known database if it is only slightly different from those in the known database and many new links were found the last time the slightly different link occurred.

Additionally, in an embodiment of the present method an occurrence of an end condition may be added for ending the retrieval of webpages and identification of links. When the end conditions are met the collection of links ends. End conditions include time base conditions, wherein collecting links ends based upon the durations of time. For example, the program may stop collecting links and retrieving webpages after 5, 10, 15, and 20 minutes spent crawling or anytime in-between. It is further contemplated that other times may be used either exceeding 20 minutes or less than 5 minutes. However, the present method does desire speed of operation.

A further end condition may be link based wherein the number of links examined determines the end of the method. For example, the method may stop collecting at any set place between 300 to 700 links found. However it is contemplated the number of links may exceed 700 or be fewer than 300. Once again the present method does desire speed of operation and fewer links does decrease the time of operation with the lower limit being the adequacy of the search. Finally, an end condition may simply be the method has run out of new pages to crawl.

Attack Testing Process

In testing for web application vulnerabilities the method in one embodiment combines various attacks at once and evaluates the output looking for all possible vulnerabilities at once. By way of example, the method generates an attack string directed to the requested unique link designed to evoke structured query languages (SQL), cross-site scripting (XSS), remote file inclusion (RFI) errors all at once. The attack is initiated and vulnerabilities are identified. For threats where this is possible to accomplish this vastly reduces the number of attack permutations perform for each attack vector.

Referring now in greater detail to the drawings in which like numerals indicate like items throughout the several views, FIGS. 1-2 depict the present method of indentifying vulnerabilities in web applications, in the various embodiments of the present invention.

FIG. 1 depicts an embodiment of the present method as a flow chart showing the identification of links of interest and security vulnerabilities. The method of detecting website vulnerabilities includes connecting to a website 2 to evaluate the website for web application vulnerabilities. The method includes retrieving a webpage 4 from the website 2 and identifying a link 6 within the retrieved webpage. The method further includes comparing the identified link to a known database of links to determine a unique link 8. Once the unique links are identified the method can request the unique links from a server 10 for evaluating vulnerabilities.

The method generates an attack string directed to the requested unique link 12 and identifies any security vulnerabilities 14 within the requested unique link. As shown in FIG. 2 the step of identifying security vulnerabilities 14 includes storing the attack information 16 and reporting 18 the same.

Also illustrated in FIG. 2 are the steps of discarding the identified link 5 and the parsing and storing of the link 7 as a unique link for requesting from the server 10 for testing for web vulnerabilities.

While Applicant has set forth embodiments as illustrated and described above, it is recognized that variations may be made with respect to disclosed embodiments. Therefore, while the invention has been disclosed in various forms only, it will be obvious to those skilled in the art that many additions, deletions and modifications can be made without departing from the spirit and scope of this invention, and no undue limits should be imposed except as set forth in the following claims.

What is claimed is:

1. A method of detecting website vulnerabilities, comprising the steps of;
   connecting to a website;
   retrieving a webpage from the website;
   identifying a link within the retrieved webpage;
   comparing the identified link to a known database of links to determine a unique link, wherein determining the unique link includes evaluating a degree of uniqueness when compared to the known database;
   requesting the unique link from a server;
   generating an attack string directed to the requested unique link; and
   identifying security vulnerabilities within the requested unique link.

2. The method of detecting website vulnerabilities of claim 1, further including ending the retrieval of webpages and identification of links therein upon the occurrence of an end condition.

3. The method of detecting website vulnerabilities of claim 2, wherein the end conditions are selected from the group consisting essentially of a time based event, a determined number of examined links event and a lack of new webpages to crawl.

4. The method of detecting website vulnerabilities of claim 3, wherein the time based event is between about 5 to 15 minutes.

5. The method of detecting website vulnerabilities of claim 3, wherein the determined number of examined links event is between about 300 to 700 links.

6. The method of detecting website vulnerabilities of claim 1, wherein the generated attack string instructs to evoke a plurality errors.

7. The method of detecting website vulnerabilities of claim 6, wherein the generated attack string instructs a plurality of errors is selected from two or more of the vectors groups essentially consisting of structured query languages (SQL), cross-site scripting (XSS), remote file inclusion (RFI) and combinations thereof.

8. The method of detecting website vulnerabilities of claim 1, wherein the known database is comprised of links previously found and identified, and disposing of links determined not to be unique and characterizing and storing the unique links.

9. The method of detecting website vulnerabilities of claim 1, further including comparing the determined uniqueness to a uniqueness threshold in determining the unique link.

10. A method of detecting website vulnerabilities, comprising the steps of;
- connecting to a website;
- retrieving a webpage from the website;
- identifying a link within the retrieved webpage;
- comparing the identified link to a known database of links to determine a unique link;
- disposing of links determined not to be unique and characterizing and storing the unique links;
- ending the retrieval of webpages and identification of links therein upon the occurrence of an end condition being selected from the group consisting essentially of a time based event of between about 5 to 15 minutes, a determined number of examined links event and a lack of new webpages to crawl;
- requesting the unique link from a server;
- generating an attack string directed to the requested unique link; and
- identifying security vulnerabilities within the requested unique link.

11. The method of detecting website vulnerabilities of claim 10 wherein the determined number of examined links event is between about 300 to 700 links.

12. The method of detecting website vulnerabilities of claim 10, wherein the generated attack string instructs to evoke a plurality errors.

13. The method of detecting website vulnerabilities of claim 12, wherein the generated attack string instructs a plurality of errors is selected from two or more of the vectors groups essentially consisting of structured query languages (SQL), cross-site scripting (XSS), remote file inclusion (RFI) and combinations thereof.

14. The method of detecting website vulnerabilities of claim 10, wherein determining the unique link includes evaluating a degree of uniqueness when compared to the known database, wherein the determined uniqueness to a uniqueness threshold in determining the unique link.

15. A method of detecting website vulnerabilities, comprising the steps of;
- connecting to a website;
- retrieving a webpage from the website;
- identifying a link within the retrieved webpage;
- comparing the identified link to a known database of links to determine a unique link, wherein determining the unique link includes evaluating a degree of uniqueness when compared to the known database and disposing of links not determined to be unique and characterizing and storing the unique links; ending the retrieval of webpages and identification of links therein upon the occurrence of an end condition selected from the group consisting essentially of a time based event, a determined number of examined links event and a lack of new webpages to crawl;
- requesting the unique link from a server;
- generating an attack string directed to the requested unique link, wherein the generated attack string instructs a plurality of errors is selected from two or more of the vectors groups essentially consisting of structured query languages (SQL), cross-site scripting (XSS), remote file inclusion (RFI) and combinations thereof; and
- identifying security vulnerabilities within the requested unique link.

16. The method of detecting website vulnerabilities of claim 15, further including comparing the determined uniqueness to a uniqueness threshold in determining the unique link.

17. The method of detecting website vulnerabilities of claim 15, wherein the time based event is between about 5 to 15 minutes and the determined number of examined links event is between about 300 to 700 links.

* * * * *